US008933815B2

(12) United States Patent  
Kagan et al.

(10) Patent No.: US 8,933,815 B2  
(45) Date of Patent: Jan. 13, 2015

(54) INTELLIGENT ELECTRONIC DEVICE HAVING AN XML-BASED GRAPHICAL INTERFACE

(75) Inventors: Erran Kagan, Great Neck, NY (US); Joseph Spanier, Brooklyn, NY (US); Wei Wang, Bronx, NY (US); Dulciane Siqueira da Silva, Campinan, NY (US)

(73) Assignee: Electro Industries/Gauge Tech, Westbury, NY (US)

( * ) Notice: Subject to any disclaimer, the term of this patent is extended or adjusted under 35 U.S.C. 154(b) by 1839 days.

(21) Appl. No.: 11/589,378

(22) Filed: Oct. 30, 2006

(65) Prior Publication Data

US 2007/0096942 A1 May 3, 2007

Related U.S. Application Data

(60) Provisional application No. 60/731,005, filed on Oct. 28, 2005.

(51) Int. Cl.
  *G08C 15/06* (2006.01)
  *G01D 4/00* (2006.01)
  *G01D 7/02* (2006.01)

(52) U.S. Cl.
  CPC .............. *G01D 4/002* (2013.01); *Y04S 20/32* (2013.01); *Y02B 90/241* (2013.01); *Y02B 90/248* (2013.01); *G01D 7/02* (2013.01); *Y04S 20/52* (2013.01)
  USPC ................................. 340/870.02; 340/870.03

(58) Field of Classification Search
  USPC ........................................ 340/870.02, 870.03
  See application file for complete search history.

(56) References Cited

U.S. PATENT DOCUMENTS

| 4,697,180 | A | * | 9/1987 | Swanson .................. 340/870.02 |
| 4,697,182 | A | * | 9/1987 | Swanson .................. 340/870.02 |
| 5,650,936 | A |   | 7/1997 | Loucks et al. |
| 5,719,564 | A | * | 2/1998 | Sears ........................ 340/870.02 |
| 5,736,847 | A |   | 4/1998 | Van Doorn et al. |
| 5,828,576 | A |   | 10/1998 | Loucks et al. |
| 5,995,911 | A |   | 11/1999 | Hart |
| 6,000,034 | A |   | 12/1999 | Lightbody et al. |
| D427,533 | S |   | 7/2000 | Cowan et al. |

(Continued)

OTHER PUBLICATIONS

Xu Hong, Wang Jianhua, "An Extendable Data Engine based on OPC Spcification"; Computer Standards & Interfaecs 26 (2004) 515-525; Dec. 5, 2003.

*Primary Examiner* — Hai Phan
*Assistant Examiner* — Amine Benlagsir
(74) *Attorney, Agent, or Firm* — Gerald E. Hespos; Michael J. Porco; Matthew T. Hespos

(57) ABSTRACT

An intelligent electronic device (IED) having an interface for displaying data sensed and generated by the intelligent electronic device and other IEDs on a network is provided. The intelligent electronic device includes at least one sensor coupled to the electric circuit configured for measuring at least one power parameter of the electrical circuit and generating at least one analog signal indicative of the at least one power parameter; at least one digital to analog converter coupled to the at least one sensor configured for receiving the at least one analog signal and converting the at least one analog signal to at least one digital signal; a processor configured for receiving the at least one digital signal and generating energy data; a communication device configured for accessing at least one second intelligent electronic device; and an interface configured for displaying data generated by the at least one second intelligent electronic device.

43 Claims, 14 Drawing Sheets

(56) References Cited

U.S. PATENT DOCUMENTS

| | | | |
|---|---|---|---|
| D429,655 S | 8/2000 | Cowan et al. | |
| D435,471 S | 12/2000 | Simbeck et al. | |
| 6,185,508 B1 | 2/2001 | Van Doorn et al. | |
| 6,186,842 B1 | 2/2001 | Hirschbold et al. | |
| D439,535 S | 3/2001 | Cowan et al. | |
| 6,236,949 B1 | 5/2001 | Hart | |
| D443,541 S | 6/2001 | Hancock et al. | |
| 6,397,155 B1 | 5/2002 | Przydatek et al. | |
| D458,863 S | 6/2002 | Harding et al. | |
| D459,259 S | 6/2002 | Harding et al. | |
| 6,493,644 B1 | 12/2002 | Jonker et al. | |
| 6,563,697 B1 | 5/2003 | Simback et al. | |
| 6,611,773 B2 | 8/2003 | Przydatek et al. | |
| 6,611,922 B2 | 8/2003 | Ozcetin et al. | |
| 6,615,147 B1 | 9/2003 | Jonker et al. | |
| 6,636,030 B1 | 10/2003 | Rose et al. | |
| 6,671,635 B1 | 12/2003 | Forth et al. | |
| 6,671,654 B1 | 12/2003 | Forth et al. | |
| 6,687,627 B1 | 2/2004 | Gunn et al. | |
| 6,694,270 B2 | 2/2004 | Hart | |
| 6,735,535 B1 | 5/2004 | Kagan et al. | |
| 6,737,855 B2 | 5/2004 | Huber et al. | |
| 6,745,138 B2 | 6/2004 | Przydatek et al. | |
| 6,751,562 B1 | 6/2004 | Blackett et al. | |
| 6,751,563 B2 | 6/2004 | Spanier et al. | |
| 6,792,337 B2 | 9/2004 | Blackett et al. | |
| 6,792,364 B2 | 9/2004 | Jonker et al. | |
| 6,798,190 B2 | 9/2004 | Harding et al. | |
| 6,798,191 B1 | 9/2004 | Macfarlane et al. | |
| 6,813,571 B2 | 11/2004 | Lightbody et al. | |
| 6,819,098 B2 * | 11/2004 | Villicana et al. | 340/870.02 |
| 6,825,776 B2 | 11/2004 | Lightbody et al. | |
| 6,853,978 B2 | 2/2005 | Forth et al. | |
| 6,871,150 B2 | 3/2005 | Huber et al. | |
| D505,087 S | 5/2005 | Ricci et al. | |
| 6,944,555 B2 | 9/2005 | Blackett et al. | |
| 6,957,158 B1 | 10/2005 | Hancock et al. | |
| 6,961,641 B1 | 11/2005 | Forth et al. | |
| 6,983,211 B2 | 1/2006 | Macfarlene et al. | |
| 6,988,025 B2 | 1/2006 | Ransom et al. | |
| 6,988,182 B2 | 1/2006 | Teachman et al. | |
| 6,990,395 B2 | 1/2006 | Ransom et al. | |
| 7,006,934 B2 | 2/2006 | Jonker et al. | |
| 7,010,438 B2 | 3/2006 | Hancock et al. | |
| 7,072,779 B2 | 7/2006 | Hancock et al. | |
| 7,085,824 B2 | 8/2006 | Forth et al. | |
| 7,089,089 B2 | 8/2006 | Cumming et al. | |
| 7,127,328 B2 | 10/2006 | Ransom | |
| D532,747 S | 11/2006 | Ricci et al. | |
| 7,136,384 B1 | 11/2006 | Wang | |
| D534,120 S | 12/2006 | Ricci et al. | |
| 7,155,350 B2 | 12/2006 | Kagan | |
| 7,158,050 B2 | 1/2007 | Lightbody et al. | |
| 7,174,258 B2 | 2/2007 | Hart | |
| 7,174,261 B2 | 2/2007 | Gunn et al. | |
| 7,184,904 B2 | 2/2007 | Kagan | |
| 7,188,003 B2 | 3/2007 | Ransom et al. | |
| 7,191,076 B2 | 3/2007 | Huber et al. | |
| 7,216,043 B2 | 5/2007 | Ransom et al. | |
| 7,246,014 B2 | 7/2007 | Forth et al. | |
| 7,248,977 B2 | 7/2007 | Hart | |
| 7,248,978 B2 | 7/2007 | Ransom | |
| 7,249,265 B2 | 7/2007 | von Carolsfeld et al. | |
| 7,256,709 B2 | 8/2007 | Kagan | |
| 7,271,996 B2 | 9/2007 | Kagan et al. | |
| 7,294,997 B2 | 11/2007 | Kagan | |
| 7,304,586 B2 | 12/2007 | Wang et al. | |
| 7,305,310 B2 | 12/2007 | Slota et al. | |
| 7,337,081 B1 | 2/2008 | Kagan | |
| 7,516,106 B2 * | 4/2009 | Ehlers et al. | 705/412 |
| 2001/0025377 A1 * | 9/2001 | Hinderks | 725/109 |
| 2002/0114326 A1 | 8/2002 | Mahalingaiah | |
| 2002/0162014 A1 | 10/2002 | Przydatek et al. | |
| 2002/0165677 A1 | 11/2002 | Lightbody et al. | |
| 2003/0014200 A1 | 1/2003 | Jonker et al. | |
| 2003/0065459 A1 | 4/2003 | Huber et al. | |
| 2003/0067490 A1 * | 4/2003 | Murakami | 345/771 |
| 2003/0101008 A1 | 5/2003 | Hart | |
| 2003/0105608 A1 | 6/2003 | Hart | |
| 2003/0132742 A1 | 7/2003 | Harding et al. | |
| 2003/0154471 A1 | 8/2003 | Teachman et al. | |
| 2003/0177440 A1 * | 9/2003 | Kegoya et al. | 715/500 |
| 2003/0177501 A1 * | 9/2003 | Takahashi et al. | 725/110 |
| 2003/0210699 A1 | 11/2003 | Holt, Sr. et al. | |
| 2003/0212512 A1 | 11/2003 | Hart | |
| 2003/0220752 A1 | 11/2003 | Hart | |
| 2004/0066311 A1 | 4/2004 | Giles et al. | |
| 2004/0138786 A1 * | 7/2004 | Blackett et al. | 700/295 |
| 2004/0138787 A1 * | 7/2004 | Ransom et al. | 700/295 |
| 2004/0138835 A1 | 7/2004 | Ransom et al. | |
| 2004/0172207 A1 | 9/2004 | Hancock et al. | |
| 2004/0183522 A1 | 9/2004 | Gunn et al. | |
| 2004/0229578 A1 | 11/2004 | Lightbody et al. | |
| 2005/0017874 A1 | 1/2005 | Lightbody et al. | |
| 2005/0027464 A1 | 2/2005 | Jonker et al. | |
| 2005/0071106 A1 | 3/2005 | Huber et al. | |
| 2005/0114361 A1 * | 5/2005 | Roberts et al. | 707/100 |
| 2005/0275397 A1 | 12/2005 | Lightbody et al. | |
| 2005/0288876 A1 | 12/2005 | Doig et al. | |
| 2005/0288877 A1 | 12/2005 | Doig et al. | |
| 2006/0052958 A1 | 3/2006 | Hancock et al. | |
| 2006/0071813 A1 | 4/2006 | Kagan | |
| 2006/0077999 A1 | 4/2006 | Kagan et al. | |
| 2006/0086893 A1 | 4/2006 | Spanier et al. | |
| 2006/0161400 A1 | 7/2006 | Kagan | |
| 2006/0170409 A1 | 8/2006 | Kagan et al. | |
| 2006/0230394 A1 | 10/2006 | Forth et al. | |
| 2006/0271244 A1 | 11/2006 | Cumming et al. | |
| 2007/0067119 A1 | 3/2007 | Loewen et al. | |
| 2007/0067121 A1 | 3/2007 | Przydatek et al. | |
| 2007/0096942 A1 * | 5/2007 | Kagan et al. | 340/870.02 |
| 2007/0136010 A1 | 6/2007 | Gunn et al. | |
| 2008/0046205 A1 | 2/2008 | Gilbert et al. | |
| 2008/0065335 A1 | 3/2008 | Doig et al. | |
| 2009/0199084 A1 * | 8/2009 | Motohashi | 715/234 |
| 2009/0235156 A1 * | 9/2009 | Wake et al. | 715/234 |

* cited by examiner

```xml
<?xml version="1.0" encoding="utf-8" ?>
<!-- Electro Industries/GaugeTech, demo LCD screen configuration file
-->
- <EIG_DISPLAY>
  - <EIG_SYSTEM>
      <system_settings AUTO_SCROLL="YES" FIRST_SCREEN="8"
        TEXT_RESOURCE_FILE="C:\EIG_LCD\USER\user_text_resource.utr" />
    </EIG_SYSTEM>
  - <EIG_SCREEN>
      <SCREEN_ID>1</SCREEN_ID>
      <screen_settings REFRESH_INTERVAL="1" WALLPAPER=""
        BACKGROUND_COLOR="BLACK" COLOR_OPTIMUM="OFF"
        PICTURE_1="C:\EIG_LCD\USER\Top-Nav-b1.gif"
        PICTURE_2="C:\EIG_LCD\USER\Top-Nav-b2.gif"
        PICTURE_3="C:\EIG_LCD\USER\arrow-back.gif"
        PICTURE_4="C:\EIG_LCD\USER\arrow-fwd.gif"
        PICTURE_5="C:\EIG_LCD\USER\home.gif"
        PICTURE_6="C:\EIG_LCD\USER\table1.gif"
        PICTURE_7="C:\EIG_LCD\USER\System.GIF" PICTURE_8=""
        PICTURE_9="" PICTURE_10="" PICTURE_11="" PICTURE_12=""
        PICTURE_13="" PICTURE_14="" PICTURE_15="" PICTURE_16="" />
      - <EIG_ELEMENTS>
          <item ITEM_TYPE="PEG_ICON" TOP="46" LEFT="10" HEIGHT="210"
            WIDTH="300" PICTURE_ID="6" />
          <item ITEM_TYPE="PEG_ICON" TOP="5" LEFT="0" HEIGHT="22"
            WIDTH="320" PICTURE_ID="1" />
          <item ITEM_TYPE="PEG_PROMPT" TOP="5" LEFT="0" HEIGHT="17"
            WIDTH="170" FONT_TYPE="Title" FONT_STYLE="Regular"
            FONT_SIZE="18pts" FOR_COLOR="WHITE" BACK_COLOR="TRANS"
            BOARDER="NONE" TEXT_ID="2" TEXT_ALIGN="LEFT"
            DATA_ID="" />
          <item ITEM_TYPE="PEG_PROMPT" TOP="45" LEFT="90" HEIGHT="20"
            WIDTH="80" FONT_TYPE="LucidaSans" FONT_STYLE="Regular"
            FONT_SIZE="8pts" FOR_COLOR="BLACK" BACK_COLOR="TRANS"
            BOARDER="NONE" TEXT_ID="3" TEXT_ALIGN="CENTER"
            DATA_ID="" />
          <item ITEM_TYPE="PEG_PROMPT" TOP="45" LEFT="170"
            HEIGHT="20" WIDTH="80" FONT_TYPE="LucidaSans"
            FONT_STYLE="Regular" FONT_SIZE="8pts" FOR_COLOR="BLACK"
            BACK_COLOR="TRANS" BOARDER="NONE" TEXT_ID="4"
            TEXT_ALIGN="CENTER" DATA_ID="" />
          <item ITEM_TYPE="PEG_PROMPT" TOP="45" LEFT="240"
            HEIGHT="20" WIDTH="80" FONT_TYPE="LucidaSans"
            FONT_STYLE="Regular" FONT_SIZE="8pts" FOR_COLOR="BLACK"
            BACK_COLOR="TRANS" BOARDER="NONE" TEXT_ID="5"
            TEXT_ALIGN="CENTER" DATA_ID="" />
          <item ITEM_TYPE="PEG_PROMPT" TOP="60" LEFT="5" HEIGHT="20"
            WIDTH="80" FONT_TYPE="LucidaSans" FONT_STYLE="Regular"
            FONT_SIZE="8pts" FOR_COLOR="GREEN" BACK_COLOR="TRANS"
            BOARDER="NONE" TEXT_ID="6" TEXT_ALIGN="CENTER"
```

FIG. 3A

```
          DATA_ID="" />
        <item ITEM_TYPE="PEG_PROMPT" TOP="80" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="7" TEXT_ALIGN="CENTER"
          DATA_ID="" />
        <item ITEM_TYPE="PEG_PROMPT" TOP="100" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="8" TEXT_ALIGN="CENTER"
          DATA_ID="" />
        <item ITEM_TYPE="PEG_PROMPT" TOP="120" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="9" TEXT_ALIGN="CENTER"
          DATA_ID="" />
        <item ITEM_TYPE="PEG_PROMPT" TOP="140" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="10" TEXT_ALIGN="CENTER"
          DATA_ID="" />
        <item ITEM_TYPE="PEG_PROMPT" TOP="160" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="11" TEXT_ALIGN="CENTER"
          DATA_ID="" />
        <item ITEM_TYPE="PEG_PROMPT" TOP="180" LEFT="5" HEIGHT="20"
          WIDTH="80" FONT_TYPE="LucidaSans" FONT_STYLE="Regular"
          FONT_SIZE="8pts" FOR_COLOR="GREEN" BACK_COLOR="TRANS"
          BOARDER="NONE" TEXT_ID="12" TEXT_ALIGN="CENTER"
          DATA_ID="" />
        <item ITEM_TYPE="PEG_PROMPT" TOP="60" LEFT="90" HEIGHT="20"
          WIDTH="80" FONT_TYPE="Data" FONT_STYLE="Regular"
          FONT_SIZE="12pts" FOR_COLOR="WHITE" BACK_COLOR="TRANS"
          BOARDER="NONE" TEXT_ID="" TEXT_ALIGN="CENTER"
          DATA_ID="1_1" />
        <item ITEM_TYPE="PEG_PROMPT" TOP="80" LEFT="90" HEIGHT="20"
          WIDTH="80" FONT_TYPE="Data" FONT_STYLE="Regular"
          FONT_SIZE="12pts" FOR_COLOR="WHITE" BACK_COLOR="TRANS"
          BOARDER="NONE" TEXT_ID="" TEXT_ALIGN="CENTER"
          DATA_ID="1_2" />
        <item ITEM_TYPE="PEG_PROMPT" TOP="100" LEFT="90"
          HEIGHT="20" WIDTH="80" FONT_TYPE="Data"
          FONT_STYLE="Regular" FONT_SIZE="12pts" FOR_COLOR="WHITE"
          BACK_COLOR="TRANS" BOARDER="NONE" TEXT_ID=""
          TEXT_ALIGN="CENTER" DATA_ID="1_3" />
        <item ITEM_TYPE="PEG_PROMPT" TOP="120" LEFT="90"
          HEIGHT="20" WIDTH="80" FONT_TYPE="Data"
          FONT_STYLE="Regular" FONT_SIZE="12pts" FOR_COLOR="WHITE"
          BACK_COLOR="TRANS" BOARDER="NONE" TEXT_ID=""
          TEXT_ALIGN="CENTER" DATA_ID="1_4" />
```

FIG. 3B

```
<item ITEM_TYPE="PEG_PROMPT" TOP="140" LEFT="90"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_5" />
<item ITEM_TYPE="PEG_PROMPT" TOP="160" LEFT="90"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_6" />
<item ITEM_TYPE="PEG_PROMPT" TOP="180" LEFT="90"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_7" />
<item ITEM_TYPE="PEG_PROMPT" TOP="60" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_12" />
<item ITEM_TYPE="PEG_PROMPT" TOP="80" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_13" />
<item ITEM_TYPE="PEG_PROMPT" TOP="100" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_14" />
<item ITEM_TYPE="PEG_PROMPT" TOP="120" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_15" />
<item ITEM_TYPE="PEG_PROMPT" TOP="140" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_16" />
<item ITEM_TYPE="PEG_PROMPT" TOP="160" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_17" />
<item ITEM_TYPE="PEG_PROMPT" TOP="180" LEFT="170"
  HEIGHT="20" WIDTH="80" FONT_TYPE="Data"
  FONT_STYLE="Regular" FONT_SIZE="12pts" FOR_COLOR="WHITE"
  BACK_COLOR="TRANS" BOARDER="NONE" TEXT_ID=""
  TEXT_ALIGN="CENTER" DATA_ID="1_18" />
<item ITEM_TYPE="PEG_PROMPT" TOP="60" LEFT="240"
```

FIG. 3C

```xml
        HEIGHT="20" WIDTH="80" FONT_TYPE="Data" FONT_STYLE="Regular"
        FONT_SIZE="12pts" FOR_COLOR="WHITE" BACK_COLOR="TRANS"
        BOARDER="NONE" TEXT_ID="" TEXT_ALIGN="CENTER"
        DATA_ID="1_23" />
      <item ITEM_TYPE="PEG_PROMPT" TOP="80" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_24" />
      <item ITEM_TYPE="PEG_PROMPT" TOP="100" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_25" />
      <item ITEM_TYPE="PEG_PROMPT" TOP="120" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_26" />
      <item ITEM_TYPE="PEG_PROMPT" TOP="140" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_27" />
      <item ITEM_TYPE="PEG_PROMPT" TOP="160" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_28" />
      <item ITEM_TYPE="PEG_PROMPT" TOP="180" LEFT="240"
        HEIGHT="20" WIDTH="80" FONT_TYPE="Data"
        FONT_STYLE="Regular" FONT_SIZE="12pts" FOR_COLOR="WHITE"
        BACK_COLOR="TRANS" BOARDER="NONE" TEXT_ID=""
        TEXT_ALIGN="CENTER" DATA_ID="1_29" />
      <item ITEM_TYPE="PEG_STATUS_BAR" WIDTH="150"
        FONT_TYPE="Arial" FONT_STYLE="Regular" FONT_SIZE="8pts"
        FOR_COLOR="WHITE" TEXT_ID="" DATA_ID="1_35" />
      <item ITEM_TYPE="PEG_BUTTON" TOP="5" LEFT="175" HEIGHT="22"
        WIDTH="29" ACTION="MAIN" />
      <item ITEM_TYPE="PEG_BUTTON" TOP="5" LEFT="204" HEIGHT="22"
        WIDTH="29" ACTION="PAUSE_RUN" />
      <item ITEM_TYPE="PEG_BUTTON" TOP="5" LEFT="233" HEIGHT="22"
        WIDTH="29" ACTION="PREV" />
      <item ITEM_TYPE="PEG_BUTTON" TOP="5" LEFT="262" HEIGHT="22"
        WIDTH="29" ACTION="NEXT" />
      <item ITEM_TYPE="PEG_BUTTON" TOP="5" LEFT="291" HEIGHT="22"
        WIDTH="29" ACTION="JUMP[8]" />
    </EIG_ELEMENTS>
  </EIG_SCREEN>
</EIG_DISPLAY>
```

FIG. 3D

```xml
<?xml version="1.0" encoding="UTF-8" ?>
<!-- Electro Industries/GaugeTech embedded network server default
polling profile   -->
- <EIG_POLL_DATA>
  - <EIG_SYSTEM>
      <item DATA_POLL_DELAY="500" ALARM_POLL_DELAY="1000"
        SYSTEM_COMM_TIMEOUT="500" ALARM_CONTACT_PHONE=""
        ALARM_CONTACT_PERSON="Administrator" />
      <item EMAIL_1="" FORMAT_1="long" EMAIL_2="" FORMAT_2="long"
        EMAIL_3="" FORMAT_3="long" EMAIL_4="" FORMAT_4="Short"
        EMAIL_5="" FORMAT_5="Short" EMAIL_6="" FORMAT_6="Short"
        EMAIL_7="" FORMAT_7="Short" EMAIL_8="" FORMAT_8="Short" />
    </EIG_SYSTEM>
  - <DEVICE_1>
      <item DEV_TYPE="[~DEVICE_TYPE_LABEL]" DEV_PROTOCOL="Modbus
        RTU" DEV_NAME="[~DEVICE_LABEL]" DEV_ADDRESS="1" DEV_IP=""
        DEV_MAX_PACKET_LEN="127" DEV_DATA_FORMAT="0.00"
        DEV_POLL_ALARM="yes" DEV_ALARM_OPTIONS="1+2+3+4+5+7+9"
        DEV_ALARM_DELAY="0" DEV_COMM_TIMEOUT="500"
        DEV_PARENT="1" />
    - <DEV_DATA>
        <!-- Voltage, Freq, Current   -->
        <!-- Instantaneous   -->
        <item D_UID="1_1" D_LABEL="Inst Van" D_ADDR="180"
          D_LENGTH="2" D_TYPE="7" D_USE_SPECIAL="3"
          D_VALUEMODE="Primary" />
        <item D_UID="1_2" D_LABEL="Inst Vbn" D_ADDR="182"
          D_LENGTH="2" D_TYPE="7" D_USE_SPECIAL="3"
          D_VALUEMODE="Primary" />
        <item D_UID="1_3" D_LABEL="Inst Vcn" D_ADDR="184"
          D_LENGTH="2" D_TYPE="7" D_USE_SPECIAL="3"
          D_VALUEMODE="Primary" />
        <item D_UID="1_4" D_LABEL="Inst Vab" D_ADDR="198"
          D_LENGTH="2" D_TYPE="7" D_USE_SPECIAL="3"
          D_VALUEMODE="Primary" />
        <item D_UID="1_5" D_LABEL="Inst Vbc" D_ADDR="200"
          D_LENGTH="2" D_TYPE="7" D_USE_SPECIAL="3"
          D_VALUEMODE="Primary" />
        <item D_UID="1_6" D_LABEL="Inst Vca" D_ADDR="202"
          D_LENGTH="2" D_TYPE="7" D_USE_SPECIAL="3"
          D_VALUEMODE="Primary" />
        <item D_UID="1_7" D_LABEL="Inst Freq." D_ADDR="228"
          D_LENGTH="2" D_TYPE="7" D_USE_SPECIAL="0"
          D_VALUEMODE="Primary" />
        <item D_UID="1_8" D_LABEL="Inst Ia" D_ADDR="188"
          D_LENGTH="2" D_TYPE="7" D_USE_SPECIAL="1"
          D_VALUEMODE="Primary" />
        <item D_UID="1_9" D_LABEL="Inst Ib" D_ADDR="190"
          D_LENGTH="2" D_TYPE="7" D_USE_SPECIAL="1"
          D_VALUEMODE="Primary" />
```

FIG. 4A

```xml
<item D_UID="1_10" D_LABEL="Inst Ic" D_ADDR="192"
  D_LENGTH="2" D_TYPE="7" D_USE_SPECIAL="1"
  D_VALUEMODE="Primary" />
<item D_UID="1_11" D_LABEL="Inst Inc" D_ADDR="196"
  D_LENGTH="2" D_TYPE="7" D_USE_SPECIAL="2"
  D_VALUEMODE="Primary" />
<!-- Maximum Thermal Avg -->
<item D_UID="1_12" D_LABEL="Max Van" D_ADDR="300"
  D_LENGTH="2" D_TYPE="7" D_USE_SPECIAL="3"
  D_VALUEMODE="Primary" />
<item D_UID="1_13" D_LABEL="Max Vbn" D_ADDR="302"
  D_LENGTH="2" D_TYPE="7" D_USE_SPECIAL="3"
  D_VALUEMODE="Primary" />
<item D_UID="1_14" D_LABEL="Max Vcn" D_ADDR="304"
  D_LENGTH="2" D_TYPE="7" D_USE_SPECIAL="3"
  D_VALUEMODE="Primary" />
<item D_UID="1_15" D_LABEL="Max Vab" D_ADDR="318"
  D_LENGTH="2" D_TYPE="7" D_USE_SPECIAL="3"
  D_VALUEMODE="Primary" />
<item D_UID="1_16" D_LABEL="Max Vbc" D_ADDR="320"
  D_LENGTH="2" D_TYPE="7" D_USE_SPECIAL="3"
  D_VALUEMODE="Primary" />
<item D_UID="1_17" D_LABEL="Max Vca" D_ADDR="322"
  D_LENGTH="2" D_TYPE="7" D_USE_SPECIAL="3"
  D_VALUEMODE="Primary" />
<item D_UID="1_18" D_LABEL="Max Freq." D_ADDR="364"
  D_LENGTH="2" D_TYPE="7" D_USE_SPECIAL="0"
  D_VALUEMODE="Primary" />
<item D_UID="1_19" D_LABEL="Max Ia" D_ADDR="308"
  D_LENGTH="2" D_TYPE="7" D_USE_SPECIAL="1"
  D_VALUEMODE="Primary" />
<item D_UID="1_20" D_LABEL="Max Ib" D_ADDR="310"
  D_LENGTH="2" D_TYPE="7" D_USE_SPECIAL="1"
  D_VALUEMODE="Primary" />
<item D_UID="1_21" D_LABEL="Max Ic" D_ADDR="312"
  D_LENGTH="2" D_TYPE="7" D_USE_SPECIAL="1"
  D_VALUEMODE="Primary" />
<item D_UID="1_22" D_LABEL="Max Inc" D_ADDR="316"
  D_LENGTH="2" D_TYPE="7" D_USE_SPECIAL="2"
  D_VALUEMODE="Primary" />
<!-- Minimum Thermal Avg -->
<item D_UID="1_23" D_LABEL="Min Van" D_ADDR="401"
  D_LENGTH="2" D_TYPE="7" D_USE_SPECIAL="3"
  D_VALUEMODE="Primary" />
<item D_UID="1_24" D_LABEL="Min Vbn" D_ADDR="403"
  D_LENGTH="2" D_TYPE="7" D_USE_SPECIAL="3"
  D_VALUEMODE="Primary" />
<item D_UID="1_25" D_LABEL="Min Vcn" D_ADDR="405"
  D_LENGTH="2" D_TYPE="7" D_USE_SPECIAL="3"
  D_VALUEMODE="Primary" />
```

FIG. 4B

```xml
<item D_UID="1_26" D_LABEL="Min Vab" D_ADDR="419"
  D_LENGTH="2" D_TYPE="7" D_USE_SPECIAL="3"
  D_VALUEMODE="Primary" />
<item D_UID="1_27" D_LABEL="Min Vbc" D_ADDR="421"
  D_LENGTH="2" D_TYPE="7" D_USE_SPECIAL="3"
  D_VALUEMODE="Primary" />
<item D_UID="1_28" D_LABEL="Min Vca" D_ADDR="423"
  D_LENGTH="2" D_TYPE="7" D_USE_SPECIAL="3"
  D_VALUEMODE="Primary" />
<item D_UID="1_29" D_LABEL="Min Freq." D_ADDR="465"
  D_LENGTH="2" D_TYPE="7" D_USE_SPECIAL="0"
  D_VALUEMODE="Primary" />
<item D_UID="1_30" D_LABEL="Min Ia" D_ADDR="409"
  D_LENGTH="2" D_TYPE="7" D_USE_SPECIAL="1"
  D_VALUEMODE="Primary" />
<item D_UID="1_31" D_LABEL="Min Ib" D_ADDR="411"
  D_LENGTH="2" D_TYPE="7" D_USE_SPECIAL="1"
  D_VALUEMODE="Primary" />
<item D_UID="1_32" D_LABEL="Min Ic" D_ADDR="413"
  D_LENGTH="2" D_TYPE="7" D_USE_SPECIAL="1"
  D_VALUEMODE="Primary" />
<item D_UID="1_33" D_LABEL="Min Inc" D_ADDR="417"
  D_LENGTH="2" D_TYPE="7" D_USE_SPECIAL="2"
  D_VALUEMODE="Primary" />
<item D_UID="1_34" D_LABEL="Last Max Reset" D_ADDR="6019"
  D_LENGTH="4" D_TYPE="3" D_VALUEMODE="Primary" />
<item D_UID="1_35" D_LABEL="Device Date/Time" D_ADDR="85"
  D_LENGTH="4" D_TYPE="3" D_VALUEMODE="Primary" />
<item D_UID="1_36" D_LABEL="Meter Designation"
  D_ADDR="45969" D_LENGTH="8" D_TYPE="1"
  D_VALUEMODE="Primary" />
  </DEV_DATA>
 </DEVICE_1>
</EIG_POLL_DATA>
```

FIG. 4C

```xml
<?xml version="1.0" encoding="UTF-8" ?>
<EIG_DATA>
    <item D_UID="1_1" D_LABEL="Inst Van" D_VALUE="120.69" D_REF="" />
    <item D_UID="1_2" D_LABEL="Inst Vbn" D_VALUE="1.05" D_REF="" />
    <item D_UID="1_3" D_LABEL="Inst Vcn" D_VALUE="0.99" D_REF="" />
    <item D_UID="1_4" D_LABEL="Inst Vab" D_VALUE="121.24" D_REF="" />
    <item D_UID="1_5" D_LABEL="Inst Vbc" D_VALUE="0.53" D_REF="" />
    <item D_UID="1_6" D_LABEL="Inst Vca" D_VALUE="121.24" D_REF="" />
    <item D_UID="1_7" D_LABEL="Inst Freq." D_VALUE="60.00" D_REF="" />
    <item D_UID="1_12" D_LABEL="Max Van" D_VALUE="189.37" D_REF="" />
    <item D_UID="1_13" D_LABEL="Max Vbn" D_VALUE="28283.14" D_REF="" />
    <item D_UID="1_14" D_LABEL="Max Vcn" D_VALUE="183.18" D_REF="" />
    <item D_UID="1_15" D_LABEL="Max Vab" D_VALUE="2045.85" D_REF="" />
    <item D_UID="1_16" D_LABEL="Max Vbc" D_VALUE="593.80" D_REF="" />
    <item D_UID="1_17" D_LABEL="Max Vca" D_VALUE="23806.31" D_REF="" />
    <item D_UID="1_18" D_LABEL="Max Freq." D_VALUE="999.02" D_REF="" />
    <item D_UID="1_23" D_LABEL="Min Van" D_VALUE="0.00" D_REF="" />
    <item D_UID="1_24" D_LABEL="Min Vbn" D_VALUE="0.00" D_REF="" />
    <item D_UID="1_25" D_LABEL="Min Vcn" D_VALUE="0.00" D_REF="" />
    <item D_UID="1_26" D_LABEL="Min Vab" D_VALUE="0.00" D_REF="" />
    <item D_UID="1_27" D_LABEL="Min Vbc" D_VALUE="0.00" D_REF="" />
    <item D_UID="1_28" D_LABEL="Min Vca" D_VALUE="0.00" D_REF="" />
    <item D_UID="1_29" D_LABEL="Min Freq." D_VALUE="0.00" D_REF="" />
    <item D_UID="1_35" D_LABEL="Device Date/Time" D_VALUE="2006-10-26 12:48:29"
       D_REF="" />
</EIG_DATA>
```

FIG. 5 though the display uses XML data from a file, the user will be able to select files over a network, e.g., the
INTELLIGENT ELECTRONIC DEVICE HAVING AN XML-BASED GRAPHICAL INTERFACE This application claims priority on U.S. Provisional Patent Appl. No. 60/731,005, filed Oct. 28, 2005.

BACKGROUND OF THE INVENTION

1. Field of the Invention

The present disclosure relates generally to intelligent electronic devices for electrical power systems, and more particularly, to an intelligent electronic device having an XML-based graphical interface for displaying data sensed and generated by the intelligent electronic device.

2. Description of the Related Art

Electric utility companies ("utilities") track electric usage by customers by using power meters. These meters track the amount of power consumed at a particular location. These locations range from power substations, to commercial businesses, to residential homes. The electric utility companies use information obtained from the power meter to charge its customers for their power consumption, i.e. revenue metering.

A popular type of power meter is the socket-type power meter, i.e., S-base or Type S meter. As its name implies, the meter itself plugs into a socket for easy installation, removal and replacement. Other meter installations include panel mounted, switchboard mounted, and circuit breaker mounted. Typically the power meter connects between utility power lines supplying electricity and a usage point, namely a residence or commercial place of business.

A power meter may also be placed at a point within the utility's power grid to monitor power flowing through that point for distribution, power loss, or capacity monitoring, e.g., a substation. These power and energy meters are installed in substations to provide a visual display of real-time data and to alarm when problems occur. These problems include limit alarms, breaker control, outages and many other types of events. Conventionally, the visual display includes numerical information and/or an alarm indication, e.g., a LED, LCD, etc., on the face of the meter. To determine the specific type and/or cause of the alarm, a user may have to scroll through numerous lines of information, inspect the actual piece of equipment relating to the alarm or review the alarm information at a headend of a SCADA (supervisory control and data acquisition) system which may be in a different location from the meter. All of these scenarios will delay rectifying the problem and may increase downtime of a consumer receiving the power. Once the problem is identified, the user will have to retrieve correction procedures and/or equipment manuals to rectify the problem causing further delays.

Furthermore, conventional power meters only display information or indicate alarms pertaining to the individual power meter having the display. Typically, a substation includes numerous power meters at various locations making it difficult to get readings from each of the power meters with similar time parameters. To date, the only way to get an idea of system reliability and telemetry at a substation is to install a dedicated personal computer running a SCADA application. However, SCADA systems are costly and personal computers are susceptible to failure in substation environments.

Therefore, a need exists for devices, systems and methods for displaying data sensed and generated by an intelligent electronic device (IED), a power meter, and for displaying the data of a plurality of IEDs at any individual IED.

SUMMARY OF THE INVENTION

An intelligent electronic device (IED), e.g., an electrical power meter, having an XML-based graphical interface for displaying data sensed and generated by the intelligent electronic device is provided. The display of the IED of the present disclosure uses XML as its backbone allowing the display to read data out of an XML file and then display the data on a screen particular to what the customer pre-programs. Additionally, since the display uses XML data from a file, the user will be able to select files over a network, e.g., the Internet, grabbing XML data and formatting information from other meters making each meter a gateway to another meter on the system.

According to one aspect of the present disclosure, an intelligent electronic device (IED) for monitoring power usage of an electrical circuit is provided. The IED includes at least one sensor coupled to the electric circuit configured for measuring at least one power parameter of the electrical circuit and generating at least one analog signal indicative of the at least one power parameter.

At least one digital to analog converter coupled to the at least one sensor configured for receiving the at least one analog signal and converting the at least one analog signal to at least one digital signal; a processor configured for receiving the at least one digital signal and generating energy data; a communication device configured for accessing at least one second intelligent electronic device; and an interface configured for displaying data generated by the at least one second intelligent electronic device.

BRIEF DESCRIPTION OF THE DRAWINGS

The above and other aspects, features, and advantages of the present disclosure will become more apparent in light of the following detailed description when taken in conjunction with the accompanying drawings in which:

FIGS. 3A-3D illustrates an exemplary screen configuration XML file in accordance with an embodiment of the present disclosure;

FIGS. 4A-4C illustrates an exemplary poll profile XML file in accordance with an embodiment of the present disclosure;

FIG. 5 illustrates an exemplary XML data file in accordance with an embodiment of the present disclosure;

DETAILED DESCRIPTION

Figure 1:
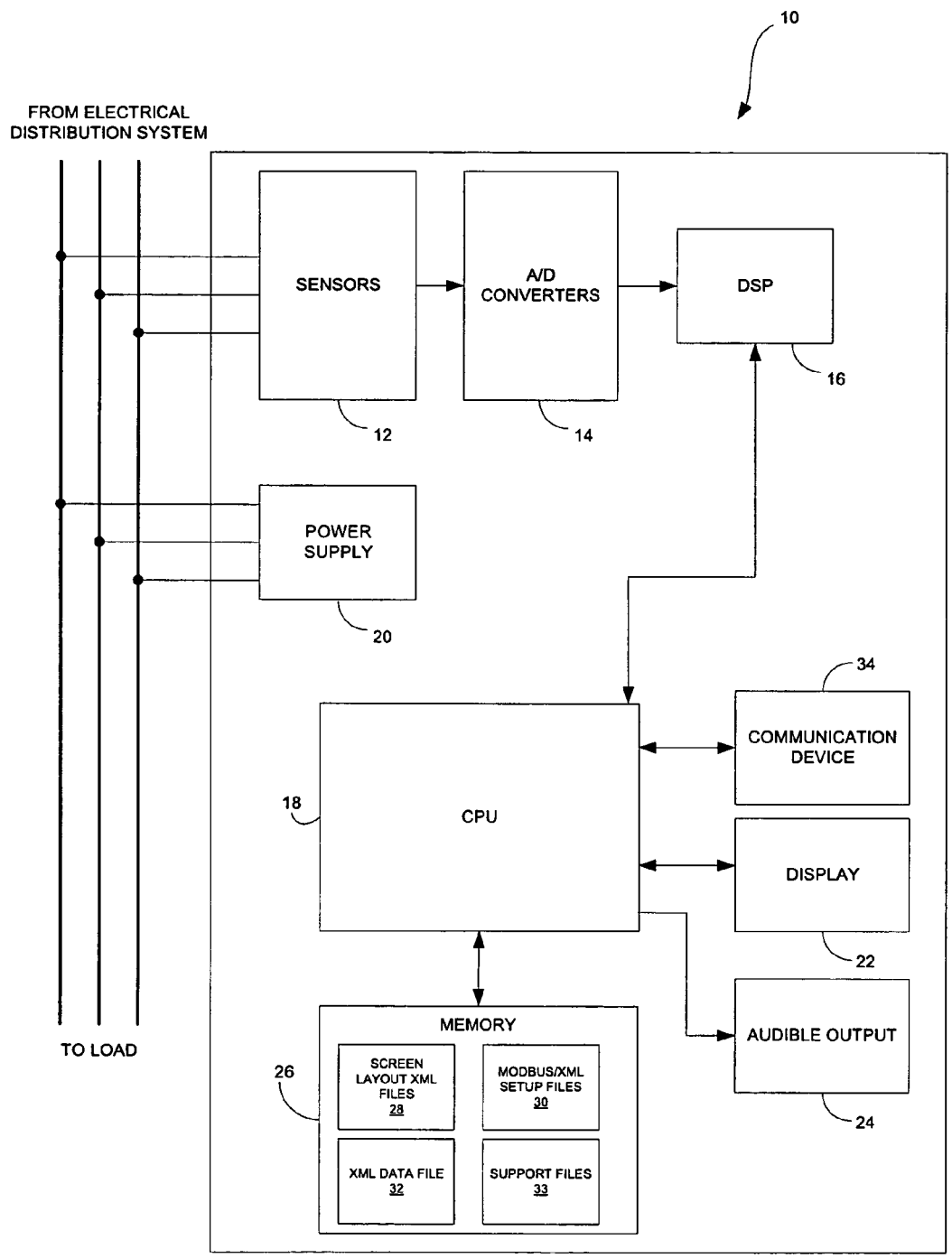
FIG. 1 is a diagram of an intelligent electronic device in accordance with an embodiment of the present disclosure.

Preferred embodiments of the present disclosure will be described hereinbelow with reference to the accompanying drawings. In the following description, well-known functions or constructions are not described in detail to avoid obscuring the present disclosure in unnecessary detail.

As used herein, intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. Exemplary intelligent electronic devices are disclosed and described in the following commonly owned U.S. issued patents and published applications: U.S. patent application Ser. No. 10/146,339 entitled "METER WITH IRDA PORT" filed on May 15, 2002; U.S. patent application Ser. No. 10/958,456 entitled "METER HAVING A COMMUNICATION INTERFACE FOR RECEIVING AND INTERFACING WITH A COMMUNICATION DEVICE" filed on Oct. 5, 2004; U.S. patent application Ser. No. 11/087,438 entitled "SYSTEM AND METHOD FOR SIMULTANEOUS COMMUNICATION ON MODBUS AND DNP 3.0 OVER ETHERNET FOR ELECTRONIC POWER METER" filed on Mar. 23, 2005; U.S. patent application Ser. No. 11/109,351 entitled 'SYSTEM AND METHOD FOR COMPENSATING FOR POTENTIAL AND CURRENT TRANSFORMERS IN ENERGY METERS" filed on Apr. 18, 2005; U.S. patent application Ser. No. 11/039,316 entitled "MULTIPLE ETHERNET PORTS ON POWER METER" filed on Jan. 19, 2005; U.S. patent application Ser. No. 11/003,064 entitled "CURRENT INPUTS INTERFACE FOR AN ELECTRICAL DEVICE" filed on Dec. 3, 2004; U.S. patent application Ser. No. 11/042,588 entitled "SYSTEM AND METHOD FOR CONNECTING ELECTRICAL DEVICES USING FIBER OPTIC SERIAL COMMUNICATION" filed on Jan. 24, 2005; U.S. Design Pat. No. D525,893 entitled "ELECTRONIC POWER METER" issued on Aug. 1, 2006; U.S. patent application Ser. No. 11/091,254 entitled "SYSTEM AND METHOD FOR PROVIDING UNIVERSAL ADDITIONAL FUNCTIONALITY FOR POWER METERS" filed on Mar. 28, 2005; U.S. patent application Ser. No. 11/341,802 entitled "METERING DEVICE WITH CONTROL FUNCTIONALITY AND METHOD THEREOF" filed on Jan. 27, 2006; U.S. Design patent application No. 29/224,737 entitled "WALL MOUNT ASSEMBLY" filed on Mar. 7, 2005; U.S. Design Pat. No. D526,920 entitled "ELECTRONIC METER" issued on Aug. 22, 2006; U.S. patent Continuation-in-Part application Ser. No. 11/317,227 entitled "TEST PULSES FOR ENABLING REVENUE TESTABLE PANEL METERS" filed on Dec. 22, 2005; U.S. Pat. No. 6,735,535 entitled "POWER METER HAVING AN AUTO-CALIBRATION FEATURE AND DATA ACQUISITION CAPABILITIES" issued on May 11, 2004; U.S. Pat. No. 6,636,030 entitled "REVENUE GRADE METER WITH HIGH-SPEED TRANSIENT DETECTION" issued on Oct. 21, 2002; U.S. Pat. No. 6,751,563 entitled "ELECTRONIC POWER METER" issued on Jun. 15, 2004; U.S. patent application Ser. No. 10/896,489 entitled "SYSTEM AND METHOD UTILIZING VIRTUAL SWITCHING FOR ELECTRIC PANEL METERING" filed on Jul. 22, 2004; U.S. patent application Ser. No. 10/896,521 entitled "ELECTRICAL METER INSTALLATION SYSTEM AND METHOD" filed on Jul. 22, 2004; U.S. patent application Ser. No. 10/969,713 entitled "TEST PULSES FOR ENABLING REVENUE TESTABLE PANEL METERS" filed on Oct. 20, 2004; U.S. patent application Ser. No. 10/969,592 entitled "SYSTEM AND METHOD FOR PROVIDING COMMUNICATION BETWEEN INTELLIGENT ELECTRONIC DEVICES VIA AN OPEN CHANNEL" filed on Oct. 20, 2004; and U.S. patent application Ser. No. 10/969,706 entitled "ON-LINE WEB ACCESSED ENERGY METER" filed on Oct. 20, 2004, the contents of all of which are hereby incorporated by reference in their entireties.

An intelligent electronic device (IED) 10 for monitoring and determining an amount of electrical power usage by a consumer and for providing audible and visual indications to a user is illustrated in FIG. 1. Generally, the IED 10 includes sensors 12, a plurality of analog-to-digital (A/D) converters 14, a processing system including a central processing unit (CPU) 18 and/or a digital signal processor (DSP) 16 and memory 26, e.g., RAM, flash memory, etc. The sensors 12 will sense electrical parameters, e.g., voltage and current, of the incoming lines from an electrical power distribution system. Preferably, the sensors will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 18 or DSP 16.

The CPU 18 is configured for receiving the digital signals from the AD converters 14 to perform the necessary calculations to determine the power usage and controlling the overall operations of the IED 10. In another embodiment, the DSP 16 will receive the digital signals from the A/D converters 14 and perform the necessary calculations to determine the power usage to free the resources of the CPU 18. It is to be appreciated that in certain embodiments the CPU 18 may perform all the functions performed by the CPU 18 and DSP 16, and therefore, in these embodiments the DSP 16 will not be utilized.

A power supply 20 is also provided for providing power to each component of the IED 10. In one embodiment, the power supply 20 is a transformer with its primary windings coupled to the incoming power distribution lines and having an appropriate number of windings to provide a nominal voltage, e.g., 5 VDC, at its secondary windings. In other embodiments, power is supplied from an independent source to the power supply 20, e.g., from a different electrical circuit, an uninterruptible power supply (UPS), etc.

The IED 10 of the present disclosure will include a multimedia user interface for interacting with a user and for communicating events, alarms and instructions to the user. The user interface will include a display 22 for providing visual indications to the user. The display 22 may include a touch screen, a liquid crystal display (LCD), a plurality of LED number segments, individual light bulbs or any combination of these. The display 22 may provide the information to the user in the form of alpha-numeric lines, computer-generated graphics, videos, animations, etc. The user interface will also include a speaker or audible output means 24 for audibly producing instructions, alarms, data, etc. The speaker 24 will be coupled to the CPU 18 via a digital-to-analog converter (D/A) for converting digital audio files stored in memory 26 to analog signals playable by the speaker 24. An exemplary interface is disclosed and described in commonly owned U.S. application Ser. No. 11/589,381, entitled "POWER METER HAVING AUDIBLE AND VISUAL INTERFACE", now U.S. Pat. No. 8,442,660, which claims priority to U.S. Provisional Patent Appl. No. 60/731,006, filed Oct. 28, 2005, the contents of which are hereby incorporated by reference in their entireties.

The IED 10 of the present disclosure will support various file types including but not limited to Microsoft Windows Media Video files (.wmv), Microsoft Photo Story files Cast), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

In addition to storing audio and/or video files, memory 26 will store the sensed and generated data for further processing and for retrieval when called upon to be displayed. The memory 26 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed.

The memory 26 will include a plurality of files for enabling the XML-based display of the present disclosure including but not limited to screen layout, e.g., configuration, XML files 28, Modbus/XML setup files 30, XML data files 32 and support files 33. The screen layout XML files 28 are configuration files that determine the screen layout of the display 22, e.g., variables to be displayed such as voltage and current, screen colors, font size of text, etc. It is to be appreciated that the screen layout XML files may be preloaded as default screen for the display. Additionally, the screen layout XML files may be created with a separate software package residing on a personal computer wherein the files may be downloaded from after created. Further, the IED 10 may include a configuration mode where screen layout can be generated and saved via the display 22. Each screen layout XML file will retrieve XML-tagged data as will be described below. An exemplary screen configuration file is illustrated in FIGS. 3A-3D.

The Modbus/XML setup files 30 will process sensed and/or generated data and will place XML tags on each piece of data. An exemplary setup file is illustrated in FIG. 4A-4C. This XML-tagged data will be stored in the XML data file 32. In one embodiment, the CPU 18 will interact with the Modbus/XML setup files 30 to tag data that was sensed and/or generated in the particular IED. In another embodiment, the CPU 18 will receive data from another IED communication device 34 operating under a known protocol, e.g., Modbus, and will interact with the Modbus/XML setup files 30 to strip the Modbus wrapper off the incoming data and to place XML tags on each piece of data. As described above, each XML-tagged data will be stored in the XML data file 32. An exemplary XML data file is illustrated in FIG. 5.

The support files 33 include but are not limited to text, fonts, images, objects, sounds, etc. The support files 33 will be used by the XML configuration files 28 to create the look and feel of the screen being displayed to the user.

It is to be appreciated that although the embodiments disclosed herein employ XML (EXtensible Markup Language) other programming languages may be employed. For example, a web server program may be stored in memory 26 and provide the data through any known web server interface format, e.g., HTML.

The IED 10 will include the communication device 34 for enabling communications between the IED 10 and other computing devices, e.g., a desktop computer, laptop computer, other IEDs, etc. The communication device 34 may be a modem, network interface card (NIC), wireless transceiver, etc. As described above, the IED 10 may be coupled to a personal computer over a network, e.g., a LAN, WAN, the Internet, serial networks such RS485, etc., via the communication device 34, where the personal computer will generate screen layout XML files to be downloaded to the IED 10.

It is to be understood that the present disclosure may be implemented in various forms of hardware, software, firmware, special purpose processors, or a combination thereof. The IED also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 2:
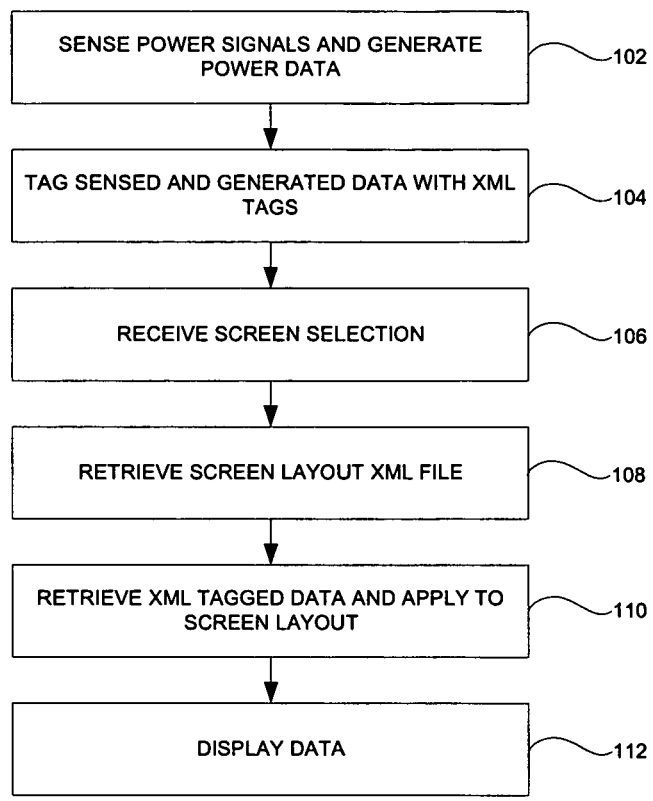
FIG. 2 is a flow chart illustrating a method for generating data to be displayed on an intelligent electronic device in accordance with the present disclosure.

Referring to FIG. 2, a method for displaying data of an IED will now be described. Initially, the IED 10 will sense voltage and current on at least one phase of an electrical distribution system (step 102). Once sensed, the DSP 16 and/or CPU 18 will perform various calculations to generate data such as phasors, power consumption, etc. The CPU 18 will interact with the Modbus/xml setup files 30 stored in memory 26 to tag the sensed and generated data with XML tags (step 104). The XML-tagged data will then be stored in the XML data files 32.

Figures 6A, 6B, 6C:
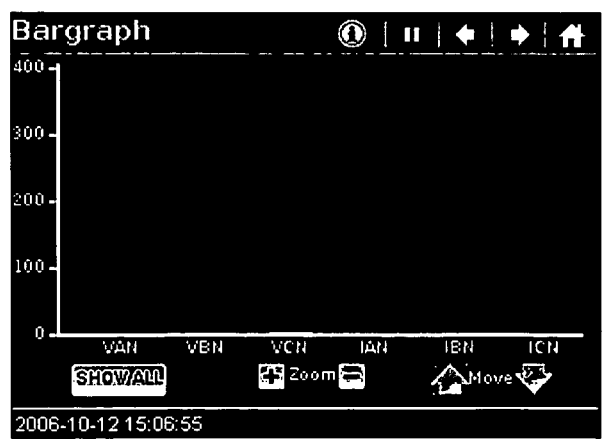
FIGS. 6A-6P illustrate several screen shots produced on a display of an intelligent electronic device in accordance with the present disclosure.
Figure 6D:
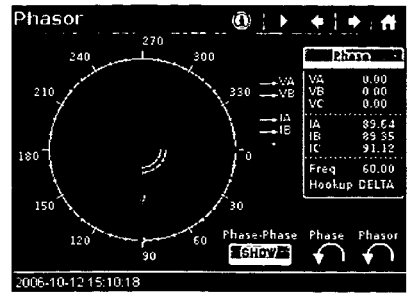
Figure 6E:
Figure 6F:
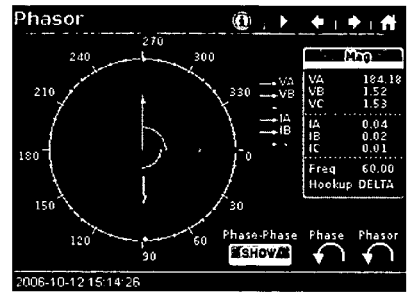
Figure 6G:
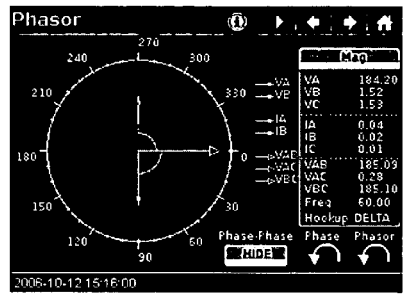
Figure 6H:
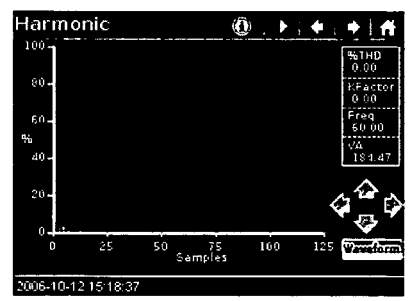
Figure 6I:
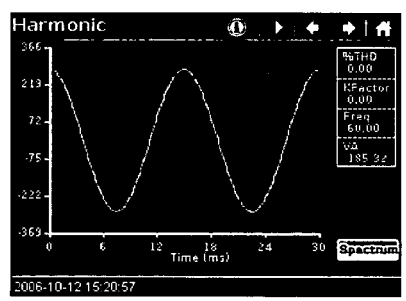
Figure 6J:
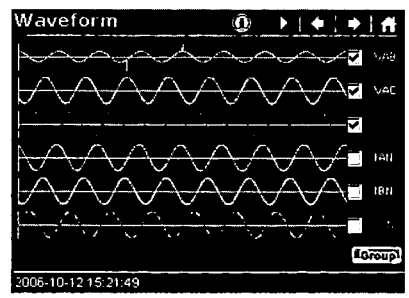
Figure 6K:
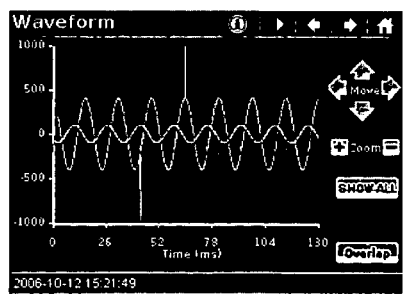
Figure 6L:
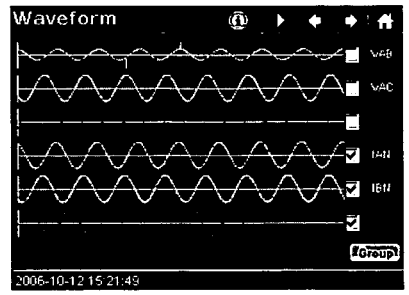
Figure 6M:
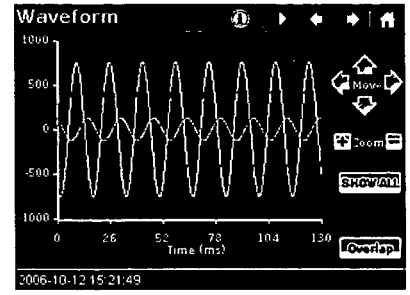
Figure 6N:
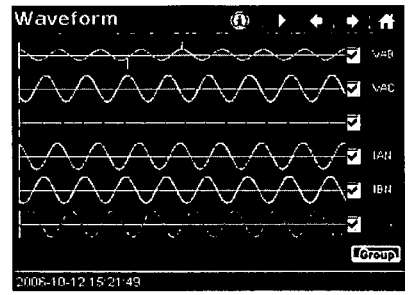
Figure 6O:
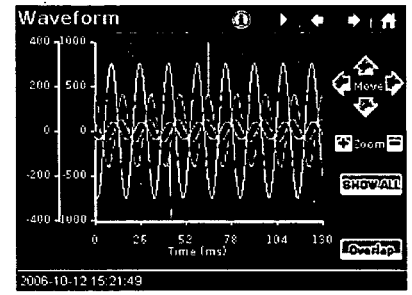
Figure 6P:
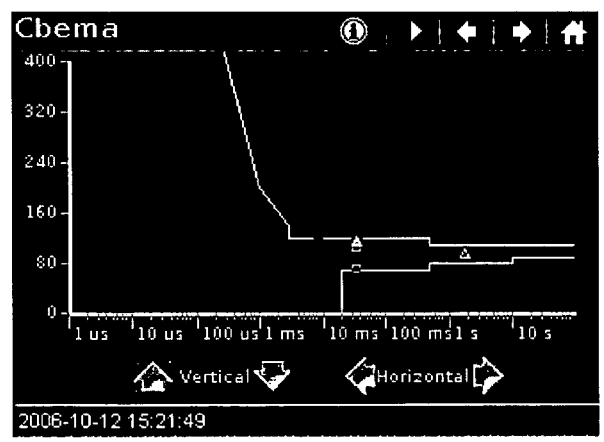

From the display 22, a user will select a desired screen layout and the CPU 18 will receive the screen selection (step 106) and will retrieve the corresponding screen layout XML file (step 108). The CPU 18 will then retrieve the XML-tagged data from the XML data file 32 and apply the data to the screen layout (step 110). The display 22 will display the data according to the screen layout selected (step 112). Exemplary screen shots of the display are illustrated in FIGS. 6A-6P. FIG. 6 corresponds to the screen configuration file shown in FIGS. 3A-3D.

Figure 7:
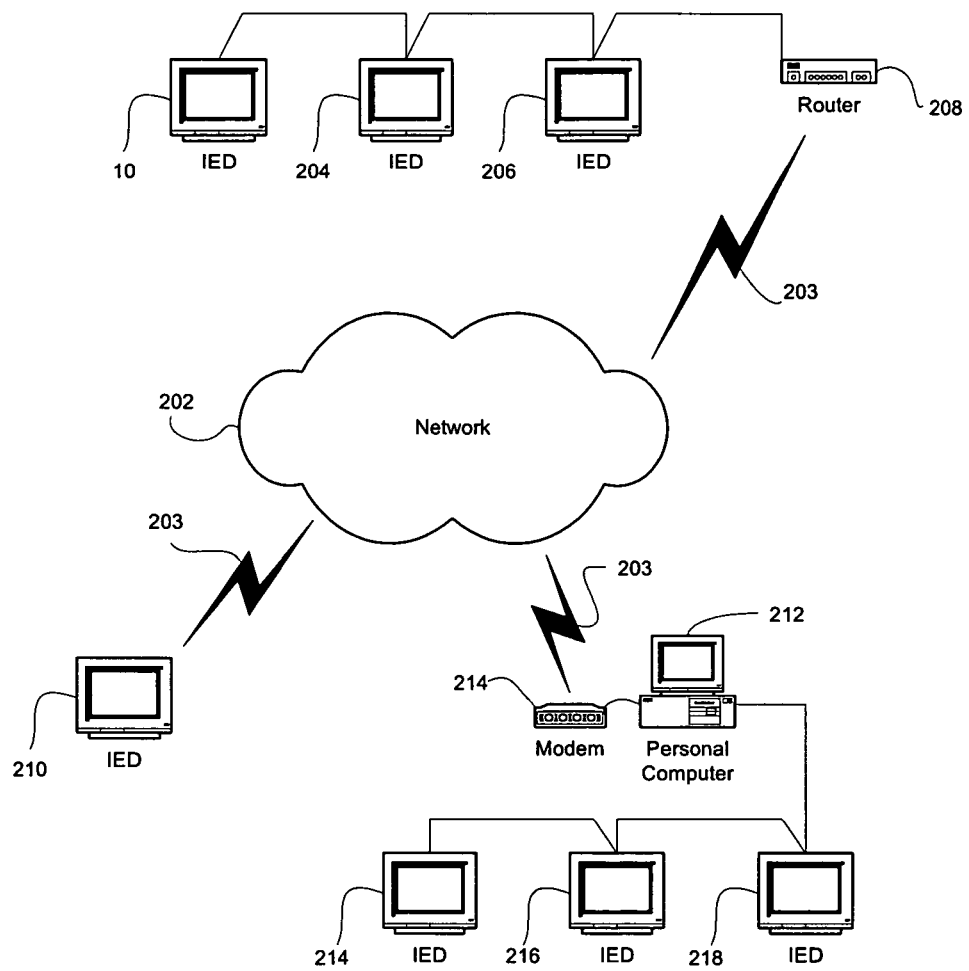
FIG. 7 is a diagram of a system of intelligent electronic devices according to an embodiment of the present disclosure.

Referring to FIG. 7, a system of displaying data on an IED is illustrated. The system may include a plurality of IEDs 10, 204, 206, 210, 214, 216, 218 coupled to a network 202 through various communications links 203, for example, dial-up, hardwired, cable, DSL, satellite, cellular, PCS, wireless transmission (e.g., 802.11a/b/g), etc. and hardware such as router 208, personal computer 212 and modem 214. It is to be appreciated that the network 202 may be a local area network (LAN), wide area network (WAN), the Internet or any known network that couples a plurality of computers to enable various modes of communication via network messages. Furthermore, the network 202 will operate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Each IED will be configured as described above so that each IED will employ identical XML tags. In this manner, an IED (e.g., IED 10) can connect to any other IED (e.g., IED 206), retrieve the XML-tagged data from the IED (e.g., IED 206) and display the data from the IED (e.g., IED 206) on the initiating IED (e.g., IED 10).

In one embodiment, at the initiating IED 10, a user will select the desired screen selection and then select the IED they want to view. To select the IED, the user will either enter the IP address of the IED or select the IED from a list of available IEDs that was preloaded. The preloaded list will include a list of all the IEDs or some identifier associated with the IED, e.g., boiler room, tenant 1, etc., in a particular system so a user can easily identify the IED they want to inquire about. Each IED or identifier in the list will have a corresponding IP address associated with it. In this manner, a user will not have to remember the IP address of each IED in a system but only its identifier. The inquiring IED 10 will then load the screen configuration file and will poll the XML data file of the IED the user wants to view, e.g., IED 206. The data from IED 206 will then be transferred to IED 10 where a user can view the data of IED 206. Advantageously, a user can be standing in one substation and look at the metering data from a meter upstream or downstream to get a real time idea of how the system is operating, not just a particular circuit.

In another embodiment, the network is self-configuring. The list associated with the IED and/or identifier will be generated at any individual IED. The initiating IED will collect the information, e.g., IP addresses, from the other IEDs on the network and assemble the IED system list. The initiating IED will then transmit the system list to each IED on the network, and therefore, enabling each IED to access every other IED.

In a further embodiment, the initiating IED will retrieve the screen configuration XML file and the XML setup file from the IED the user wants to inquire about. In this embodiment, the initiating IED 10 will retrieve the configuration XML file and XML setup file from a desired IED, e.g., IED 206. Once retrieved and loaded, the IED 10 will retrieve data from the XML data file of IED 206 as described above. The data file may or may not be automatically refreshed by the initiating IED so that the initialing IED views the data from the IED the user wants to inquire about contemporaneously with the newly generated IED data the user wants to inquire about. In this manner, any IED in the system or on the network will act as a client interface, e.g., a browser, to replicate the interface displayed on any other IED in the system or on the network which would likewise be acting as a web server. This embodiment is advantageous when two IEDs are of different types. For example, if IED 10 is a revenue meter and IED 206 is a fault recorder, the screen configuration XML file and XML setup file of the revenue meter may be incompatible with the data generated and stored in the fault recorder.

In another embodiment, the initiating IED will retrieve the screen configuration XML file and the XML setup file from the IED the user wants to inquire about. In this embodiment, the initiating IED 10 will retrieve the configuration XML file and XML setup file from a desired IED, e.g., IED 206. Once retrieved and loaded, the IED 10 will retrieve data from the XML data file of IED 206 as described above. This will enable electric power utility users to view data on the initiating IED 10 via the local display including but not limited to a liquid crystal display, a light emitting diode display, or any other such display located on the IED or near the IED connected by communication cabling or wireless. This embodiment eliminates the need for substation personnel to use a desktop or laptop personal computer running a form of Microsoft Windows, Linux (such as Redhat brand Linux) or Apple branded OS to view system power quality information from the initiating IED 10 or the IED the user wants to inquire about located remotely in a substation located either, at the present location, upstream and/or downstream from the initiating IED, e.g., IED 204, IED 206, IED 210, etc.

Additionally, it will be understood that those skilled in the art would also use other protocol architectures to accomplish the IED screen configuration XML file, the XML setup file and other above mentioned files using an architecture that does not use XML, but uses any of the following but not limited to: binary files, .CSV (comma, separated value) files, ASCII files and/or encapsulated serial over Ethernet communication or other such files formats that utilize a similar function or purpose. Moreover, it will be understood that those skilled in the art would also use just configuration parameters such as or within a programmable setting with the initiating and the receiving IED the user wants to inquire about to send or receive data and/or configuration to and from the initiating and the IED the user wishes to inquire about. While the disclosure has been shown and described with reference to certain preferred embodiments thereof, it will be understood by those skilled in the art that various changes in form and detail may be made therein without departing from the spirit and scope of the disclosure.

What is claimed is:

1. An intelligent electronic device for monitoring power of an electrical circuit comprising:

at least one sensor coupled to the electrical circuit configured for measuring at least one parameter of the electrical circuit and generating at least one analog signal indicative of the at least one parameter;

at least one analog to digital converter coupled to the at least one sensor configured for receiving the at least one analog signal and converting the at least one analog signal to at least one digital signal;

a processor configured for receiving the at least one digital signal, generating data, and tagging the generated data with XML tags to produce first XML-tagged generated data;

a memory device for storing the first XML-tagged generated data and at least one first screen layout XML file, the at least one first screen layout XML file including display variables for configuring how an interface displays the first XML-tagged generated data;

a communication device configured for retrieving at least one second screen layout XML file from at least one second intelligent electronic device and for accessing second XML-tagged data of the at least one second intelligent electronic device, the at least one second screen layout XML file including display variables for configuring how the interface displays the second XML-tagged data; and a display disposed on a face of the intelligent electronic device, the display configured for displaying the interface with the first XML-tagged generated data from the memory device in accordance with the at least one first screen layout XML file, and the display further configured for displaying the interface with the second XML-tagged data generated by the at least one second intelligent electronic device in accordance with the at least one second screen layout XML file, wherein the at least one second screen layout XML file is a client interface to replicate an interface displayed by the at least one second intelligent electronic device.

2. The intelligent electronic device as in claim 1, wherein the memory device is further configures to include at least one of configuration files and XML files.

3. The intelligent electronic device as in claim 1, wherein the first XML-tagged generated data and second XML-tagged data are revenue data.

4. The intelligent electronic device as in claim 1, wherein the communication device is configured to download a plurality of screen layout files configured for displaying data generated by the at least one second intelligent electronic device.

5. The intelligent electronic device as in claim 1, wherein the communication device comprises means for enabling communications between at least one intelligent electronic device and at least one computing device.

6. The intelligent electronic device as in claim 1, further comprising:
    a network of intelligent electronic devices; and
    a network communication device configured for accessing the network of intelligent electronic devices through the interface configured for displaying data generated by the at least one second intelligent electronic device.

7. The intelligent electronic device as in claim 6, wherein the network of intelligent electronic devices stores sensed and generated data and connects to any other of the network of the intelligent electronic devices having the same format of sensed and generated data.

8. The intelligent electronic device as in claim 1, wherein the intelligent electronic device is one of a digital electrical power and energy meter, a Programmable Logic Controller (PLC), a Remote Terminal Unit (RTU), a protective relay, or a fault recorder.

9. The intelligent electronic device as in claim 1, wherein the intelligent electronic device is one of a socket-type meter, a switchboard mounted meter or a circuit breaker mounted meter.

10. The intelligent electronic device as in claim 1, wherein the intelligent electronic device is a panel mounted meter.

11. A method for monitoring power usage by an intelligent electronic device comprising:
    sensing power signals and generating power data from the sensed power signals by a processor of at least one first intelligent electronic device;
    tagging the sensed power signals and the generated power data with XML, tags to produce first XML-tagged data;
    storing the fist XML-tagged data in a memory device of the at least one first intelligent electronic device;
    selecting an interface for displaying the first XML-tagged data;
    retrieving the interface for displaying the first XML-tagged data from the memory device of the at least one first intelligent electronic device;
    applying and displaying the retrieved interface on a display disposed on a face of the at least one first intelligent electronic device, wherein displaying the retrieved interface further comprises displaying the first XML-tagged data from the memory device of the at least one first intelligent electronic device in accordance with at least one first screen layout XML file associated with the at least one first intelligent electronic device, the at least one first screen layout XML file including display variables for configuring how the interface displays the first XML-tagged data;
    selecting at least one second intelligent electronic device;
    retrieving at least one second screen layout XML file from the at least one second intelligent electronic device, the at least one second screen layout XML file including display variables for configuring how the interface displays the second XML-tagged data;
    receiving second XML-tagged data from the at least one second intelligent electronic device; and
    applying and displaying the received second XML-tagged data on the display disposed on the face of the at least one first intelligent electronic device in accordance with the at least one second screen layout XML file associates with the at least one second intelligent electronic device, wherein the at least one second screen layout XML file is a client interface to replicate an interface displayed by the at least one second electronic device.

12. The method of monitoring power usage as in claim 11, wherein the first XML-tagged data and second XML-tagged data are revenue data.

13. A system for monitoring power usage from an electrical circuit from a plurality of intelligent electronic devices, comprising:
    a plurality of intelligent electronic devices, each intelligent electronic device comprising:
    at least one sensor coupled to the electrical circuit configured for sensing at least one parameter of the electrical circuit and generating at least one analog signal indicative of the at least one parameter;
    at least one analog to digital converter coupled to the at least one sensor configured for receiving the at least one analog signal and converting the at least one analog signal to at least one digital signal;
    a processor configured for receiving the at least one digital signal, generating data, and tagging the generated data with XML tags;
    a memory device for storing the XML-tagged generated data and at least one screen layout XML file, the at least one screen layout XML file including display variables for configuring how an interface displays the XML-tagged generated data;
    a communication device configured for retrieving at least one screen layout XML file from another intelligent electronic device and for accessing XML-tagged generated data of the other intelligent electronic device, the at least one screen layout XML file associated with the other intelligent electronic device including display variables for configuring how the interface displays the XML-tagged generated data of the other intelligent electronic device; and
    a display disposed on a face of the respective intelligent electronic device, the display configured for displaying the interface with the XML-tagged generated data from the memory device in accordance with the at least one screen layout XML file of the respective intelligent electronic device, and the display further configured for displaying the XML-tagged generated data of the other intelligent electronic device in accordance with the at least one screen layout XML file associated with the other intelligent electronic device, wherein each of the at least one screen layout XML file is a client interface to replicate an interface displayed by the other intelligent electronic device; and
    a network communication device configured to access any of the plurality of intelligent electronic devices having XML-tagged generated data to any other of the plurality of intelligent electronic devices having XML-tagged generated data.

14. The system for monitoring power usage from an electrical circuit as in claim 13, wherein the XML-tagged generated data of each of the plurality of intelligent electronic devices is viewable on the display.

15. The system for monitoring power usage from an electrical circuit as in claim 13, wherein the network communication device is self-configuring.

16. The system for monitoring power usage from an electrical circuit as in claim 13, wherein the interface for displaying data of the respective intelligent electronic device is retrieved and viewed contemporaneously with the interface for displaying data of the other intelligent electronic device.

17. The system for monitoring power usage from an electrical circuit as in claim 13, wherein the memory device is further configured for storing a plurality of files for enabling the interface to display XML-tagged generated data accessed from the other intelligent electronic device.

18. The system for monitoring power usage from an electrical circuit as in claim 17, wherein the plurality of files includes configuration files, XML files, Modbus/XML set-up files, XML data files and support files.

19. The system for monitoring power usage from an electrical circuit as in claim 13, wherein the XML-tagged generated data is revenue data.

20. The system for monitoring power usage from an electrical circuit as in claim 13, wherein the XML-tagged generated data is monitored for the plurality of intelligent electronic devices through the interface for displaying data of the plurality of intelligent electronic devices.

21. The system as in claim 13, wherein the respective intelligent electronic device is one of a digital electrical power and energy meter, a Programmable Logic Controller (PLC), a Remote Terminal Unit (RTU), a protective relay, or a fault recorder.

22. The system as in claim 13, wherein the respective intelligent electronic device is one of a socket-type meter, a switchboard mounted meter or a circuit breaker mounted meter.

23. The system as in claim 13, wherein the respective intelligent electronic device is a panel mounted meter.

24. An intelligent electronic device comprising:
at least one sensor coupled to an electrical circuit of a power distribution system configured for measuring at least one parameter of the electrical circuit and generating at least one analog signal indicative of the at least one parameter;
at least one analog to digital converter coupled to the at least one sensor configured for receiving the at least one analog signal and converting the at least one analog signal to at least one digital signal;
a processor configured for receiving the at least one digital signal, generating data, and tagging the generated data with tags to produce first tagged generated data;
a memory device for storing the first tagged generated data and at least one first screen layout file, the at least one first screen layout file including display variables for configuring how an interface displays the first tagged generated data;
a communication device configured for retrieving at least one second screen layout file from at least one second intelligent electronic device and for accessing second tagged data of the at least one second intelligent electronic device, the at least one second screen layout file including display variables for configuring how the interface displays the second tagged data; and
a display disposed on a face of the intelligent electronic device, the display configured for displaying the interface with the first tagged generated data from the memory device in accordance with the at least one first screen layout file, and the display further configured for displaying the interface with the second tagged data generated by the at least one second intelligent electronic device in accordance with the at least one second screen layout file, wherein the at least one second screen layout file is a client interface to replicate an interface displayed by the at least one second intelligent electronic device.

25. The intelligent electronic device as in claim 24, wherein the first tagged generated data and second tagged data are revenue data.

26. The intelligent electronic device as in claim 24, wherein the communication device is further configured to receive data from at least one third intelligent electronic device operating under a predetermined communication protocol and the processor is further configured to strip a wrapper of the predetermined communication protocol from the received data and tag the stripped data.

27. The intelligent electronic device as in claim 26, wherein the predetermined communication protocol is Modbus protocol.

28. The intelligent electronic device as in claim 24, wherein the first tagged generated data and second tagged data are tagged with HTML tags.

29. The intelligent electronic device as in claim 24, wherein the first tagged generated data and second tagged data are tagged with ASCII tags.

30. The intelligent electronic device as in claim 24, wherein the communication device is configured to download a plurality of screen layout files configured for displaying data generated by the at least one second intelligent electronic device.

31. The intelligent electronic device as in claim 30, wherein the display is configured to enable selection of at least one of the plurality of screen layout files and selection of the at least one second intelligent electronic device.

32. The intelligent electronic device as in claim 24, wherein the intelligent electronic device is one of a digital electrical power and energy meter, a Programmable Logic Controller (PLC), a Remote Terminal Unit (RTU), a protective relay, or a fault recorder.

33. The intelligent electronic device as in claim 24, wherein the intelligent electronic device is one of a socket-type meter, a switchboard mounted meter or a circuit breaker mounted meter.

34. The intelligent electronic device as in claim 24, wherein the intelligent electronic device is a panel mounted meter.

35. The intelligent electronic device as in claim 24, wherein the interface for displaying data of the intelligent electronic device is retrieved and viewed contemporaneously with the interface for displaying data of the at least one second intelligent electronic device.

36. An intelligent electronic device comprising:
at least one sensor coupled to an electrical circuit of a power distribution system configured for measuring at least one parameter of the electrical circuit and generating at least one analog signal indicative of the at least one parameter;
at least one analog to digital converter coupled to the at least one sensor configured for receiving the at least one analog signal and converting the at least one analog signal to at least one digital signal;
a processor configured for receiving the at least one digital signal, generating data, and tagging the generated data with tags to produce first tagged generated data;
a memory device for storing the first tagged generated data and at least one first screen layout file, the at least one first screen layout file including display variables for configuring how an interface displays the first tagged generated data;

a communication device configured for retrieving at least one second screen layout file from at least one second intelligent electronic device and for accessing second tagged data of the at least one second intelligent electronic device, the at least one second screen layout file including display variables for configuring how the interface displays the second tagged data; and a display coupled to the intelligent electronic device, the display configured for displaying the interface with the first tagged generated data from the memory device in accordance with the at least one first screen layout file, and the display further configured for displaying the interface with the second tagged data generated by the at least one second intelligent electronic device in accordance with the at least one second screen layout file, wherein the at least one second screen layout file is a client interface to replicate an interface displayed by the at least one second intelligent electronic device.

37. The intelligent electronic device as in claim 36, wherein the intelligent electronic device is one of a digital electrical power and energy meter, a Programmable Logic Controller (PLC), a Remote Terminal Unit (RTU), a protective relay, or a fault recorder.

38. The intelligent electronic device as in claim 36, wherein the intelligent electronic device is one of a socket-type meter, a switchboard mounted meter or a circuit breaker mounted meter.

39. The intelligent electronic device as in claim 36, wherein the intelligent electronic device is a panel mounted meter.

40. The intelligent electronic device as in claim 36, wherein the interface for displaying data of the intelligent electronic device is retrieved and viewed contemporaneously with the interface for displaying data of the at least one second intelligent electronic device.

41. The intelligent electronic device as in claim 36, wherein the display is coupled to the intelligent electronic device by communication cabling.

42. The intelligent electronic device as in claim 36, wherein the display is coupled to the intelligent electronic device by wireless communication.

43. The intelligent electronic device as in claim 36, wherein the display is one of a touch screen, a liquid crystal display (LCD) or a light emitting diode (LED) display.

* * * * *